United States Patent
Bowen

(10) Patent No.: US 8,638,755 B2
(45) Date of Patent: Jan. 28, 2014

(54) CONTENT-BASED HANDOVER METHOD AND SYSTEM

(75) Inventor: Donald J. Bowen, Madison, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 13/093,945

(22) Filed: Apr. 26, 2011

(65) Prior Publication Data

US 2011/0201328 A1 Aug. 18, 2011

Related U.S. Application Data

(63) Continuation of application No. 11/927,067, filed on Oct. 29, 2007, now Pat. No. 7,948,949.

(51) Int. Cl.
 *H04W 4/00* (2009.01)

(52) U.S. Cl.
 USPC ........... 370/331; 370/338; 370/341; 370/344; 370/347

(58) Field of Classification Search
 USPC ................. 370/286, 331, 338, 341, 344, 347; 375/240.01; 455/414.1, 452.1, 566; 709/227; 386/52; 725/32
 See application file for complete search history.

(56) References Cited

U.S. PATENT DOCUMENTS

| | | | |
|---|---|---|---|
| 2003/0035384 A1* | 2/2003 | Cline et al. | 370/286 |
| 2003/0144034 A1* | 7/2003 | Hack et al. | 455/566 |
| 2003/0204599 A1* | 10/2003 | Trossen et al. | 709/227 |
| 2004/0264563 A1* | 12/2004 | Inoue et al. | 375/240.01 |
| 2005/0070293 A1* | 3/2005 | Tsukiji et al. | 455/452.1 |
| 2006/0101486 A1* | 5/2006 | Kar et al. | 725/32 |
| 2006/0251384 A1* | 11/2006 | Vronay et al. | 386/52 |
| 2006/0291419 A1* | 12/2006 | McConnell et al. | 370/331 |
| 2007/0207782 A1* | 9/2007 | Tran | 455/414.1 |

* cited by examiner

*Primary Examiner* — Brian D Nguyen
*Assistant Examiner* — Toan Nguyen
(74) *Attorney, Agent, or Firm* — Guntin & Gust, PLC; Jay H. Anderson

(57) ABSTRACT

A handover of a wireless communication device is performed between a first wireless band and a second wireless band when a detected feature occurs within a content stream being communicated with the wireless communication device.

16 Claims, 4 Drawing Sheets

CONTENT-BASED HANDOVER METHOD AND SYSTEM

CROSS REFERENCE TO RELATED APPLICATIONS

This application is a continuation of U.S. patent application Ser. No. 11/927,067, now U.S. Pat. No. 7,948,949, which was filed on Oct. 29, 2007, the disclosure of which is hereby incorporated by reference into this application in its entirety.

FIELD OF THE DISCLOSURE

The present disclosure is generally related to handovers in communication systems.

BACKGROUND

Traditional cellular networks comprise multiple cellular base stations in diverse locations to serve cellular telephone users. As a user of a cellular telephone changes his/her location, handover of the cellular telephone from a first cellular base station to a second cellular base station may be performed. The handover may be performed when a signal strength of the first cellular base station diminishes below a threshold of optimum performance, and a signal strength of the second cellular base station is stronger than that of the first cellular base station.

A window of opportunity to successfully perform a handover in a cellular network may be on the order of a few seconds or more. Within this window, the handover is performed within a time interval. The time interval may be more than 10 milliseconds, and may be more than a few hundred milliseconds for a cellular network.

DETAILED DESCRIPTION OF THE DRAWINGS

Figure 1:
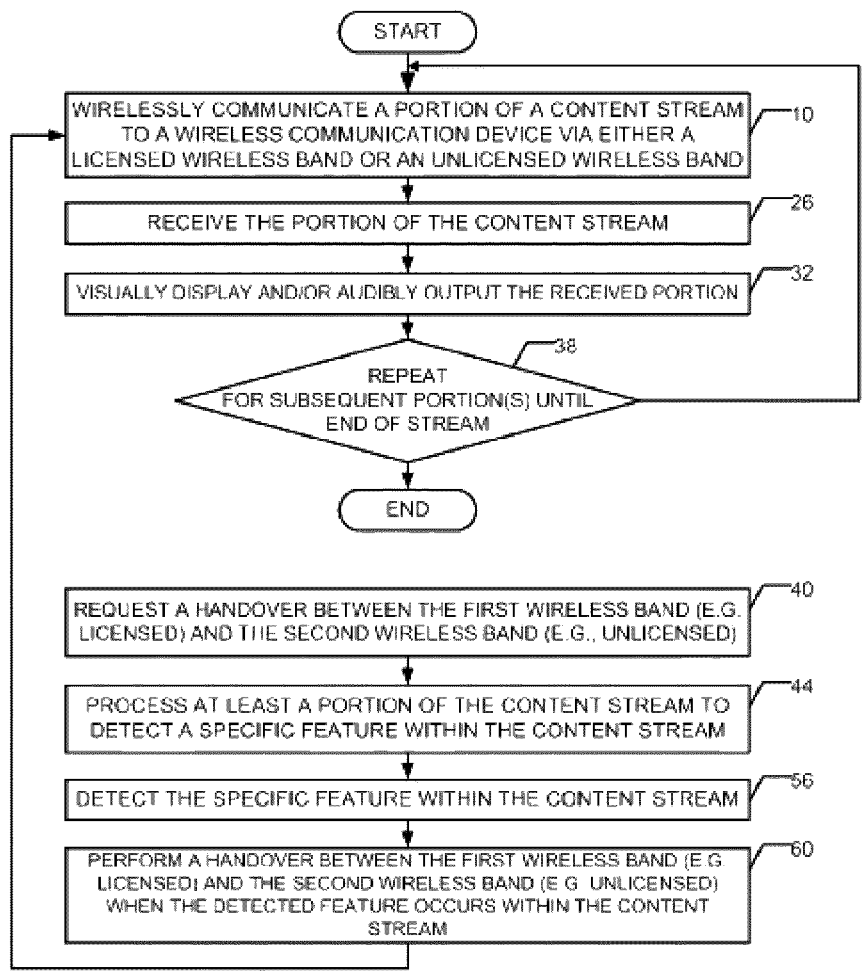
FIG. 1 is a flow chart of an embodiment of a content-based handover method.
Figure 2:
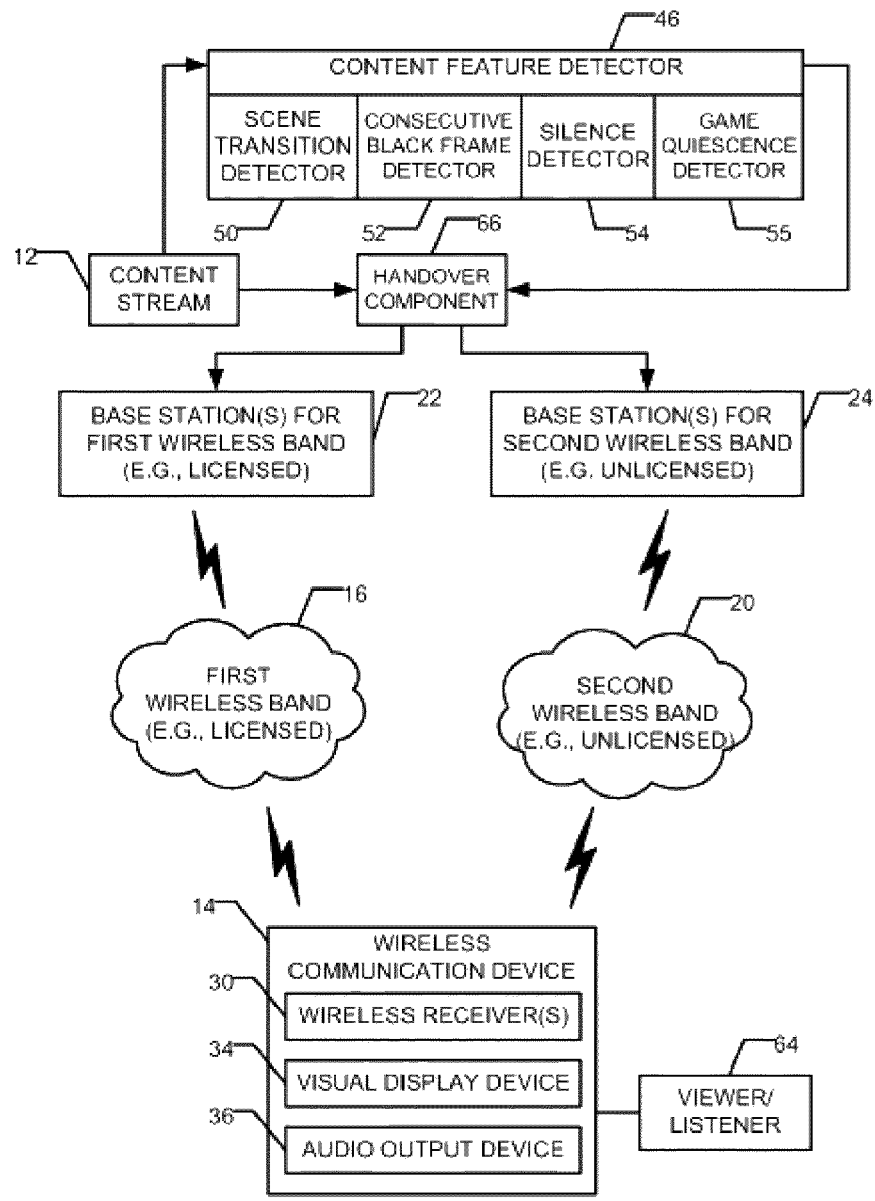
FIG. 2 is a block diagram of an embodiment of a content-based handover system.

Disclosed herein are embodiments of performing a handover when a detected feature occurs within a content stream being communicated with (e.g., either to or from) a wireless communication device. Embodiments of content-guided handovers are described with reference to FIG. 1, which is a flow chart of an embodiment of a content-based handover method, and FIG. 2, which is a block diagram of an embodiment of a content-based handover system.

In one embodiment, a method can include processing at least a portion of video content of a content stream being communicated with a wireless communication device to detect a scene transition and performing a handover of the wireless communication device between a first wireless band and a second wireless band when the scene transition occurs within the video content.

In one embodiment, an apparatus can include a memory and a processor coupled to the memory. The processor can be programmed to process at least a portion of audio content of a content stream being communicated with a wireless communication device to detect a period of silence in the audio content and perform a handover of the wireless communication device between a first wireless band and a second wireless band when the period of silence in the audio content satisfies a threshold.

In one embodiment, a non-transitory computer-readable storage medium can include computer instructions to process at least a portion of gaming content of a content stream being communicated with a wireless communication device to detect a quiescent period, and perform a handover of the wireless communication device between a first wireless band and a second wireless band when the quiescent period occurs within the content stream based on gaming packets of the gaming content satisfying a threshold.

As indicated by block 10, the method comprises wirelessly communicating a portion of a content stream 12 with a wireless communication device 14. The content stream 12 may comprise any combination of video content, audio content, voice content, and game content (e.g., gaming packets). The portion of the content stream 12 is wirelessly communicated via either a licensed wireless band 16 or an unlicensed wireless band 20. The system comprises at least one base station 22 for communicating via the licensed wireless band 16, and at least one base station 24 for communicating via the unlicensed wireless band 20.

Examples of the licensed wireless band 16 include, but are not limited to, a licensed wireless telephone network band, a licensed wireless terrestrial data network band, and a licensed satellite communication band. More specific examples of the licensed wireless band 16 include, but are not limited to, a cellular band, a personal communication service (peS) band, an A WS band, an Advanced Mobile Phone Service (AMPS) band, a licensed 700 Mhz band, a licensed 800 MHz band (e.g., GSM-850), a licensed 900 MHz band (e.g., EGSM-900), a licensed 1.4 GHz band, a licensed 1.7 GHz band, a licensed 1.8 GHz band, a licensed 1.9 GHz band, a licensed 2.1 GHz band and a licensed 2.5 GHz band. Examples of the at least one base station 22 include, but are not limited to, a cellular telephone base station, wireless terrestrial data network base station, a WiMax base station, and a satellite.

Examples of the unlicensed wireless band 20 include, but are not limited to, an unlicensed telephone communication band and an unlicensed data communication band. More specific examples of the unlicensed wireless band 20 include, but are not limited to, a Wi-Fi band, an unlicensed WiMax band, an 802.11 band, an unlicensed 2.4 GHz band, and an unlicensed 5 GHz band. Examples of the at least one base station 24 include, but are not limited to, a Wi-Fi access point and a WiMax base station.

As indicated by block 26, the method comprises the wireless communication device 14 receiving the portion of the content stream 12 via either the licensed wireless band 16 or the unlicensed wireless band 20. The wireless communication device 14 includes at least one wireless receiver 30 that is capable of wirelessly receiving content via the licensed wireless band 16 and content via the unlicensed wireless band 20. An example of the wireless communication device 14 is a wireless telephone that is capable of communicating via either a cellular telephone network or a Wi-Fi network.

As indicated by block 32, the method comprises the wireless communication device 14 visually displaying and/or audibly outputting the received portion of the content stream 12. The wireless communication device 14 comprises a visual display device 34 to display video or other visual content encoded by the content stream 12. The wireless communication device 14 further comprises an audio output device 36 to audibly output audio content encoded by the content stream 12. As indicated by block 38, the acts indicated by blocks 10, 26 and 32 may be repeated for subsequent portions of the content stream 12 so that video content and/or audio content are displayed by the wireless communication device 14 as the content stream 12 is being streamed to the wireless communication device 14.

At some time after beginning the streaming of the content stream 12 to the wireless communication device 14, but before ending the streaming of the content stream 12 to the wireless communication device, the following acts are performed. As indicated by block 40, the method optionally comprises detecting a condition to request a handover of the wireless communication device 14 between the licensed wireless band 16 and the unlicensed wireless band. The condition may be based on signal strength values and/or usability values (relative to the wireless communication device 14) associated with the licensed wireless band 16 and the unlicensed wireless band 20. The condition may be detected as the content stream 12 is being streamed to the wireless communication device 14. The requested handover may be from the licensed wireless band 16 to the unlicensed wireless band 20, or from the unlicensed wireless band 20 to the licensed wireless band 16. Alternatively, the requested handover may be between two base stations in the licensed wireless band 16, or between two base stations in the unlicensed wireless band 20.

As indicated by block 44, the method comprises processing at least a portion of the content stream 12 to attempt to detect a specific feature within the content stream 12. In general, the specific feature is a feature for which a perceived impairment in the content stream is mitigated if an error or gap occurs due to a handover. Examples of the specific feature that may be attempted to detect include, but are not limited to, a scene transition in video content, a consecutive number of black frames in video content that is greater than or equal to a threshold value (e.g., three black frames), a period of silence in audio content that is greater than or equal to a threshold value, or a quiescent period indicated by gaming packets that is greater than or equal to a threshold value.

The system may comprise a content feature detector 46 that processes the content stream 12 to attempt to detect the specific feature. The content feature detector 46 may comprise anyone or more of a scene transition detector 50, a consecutive-black-frames detector 52, and a silence detector 54, and a game quiescence detector 55. As indicated by block 56, the method comprises detecting the specific feature within the content stream 12. The specific feature may be detected as the content stream 12 is being streamed to the wireless communication device 14.

As indicated by block 60, the method comprises performing a handover of the wireless communication device 14 between the licensed wireless band 16 and the unlicensed wireless band 20 when the detected feature occurs within the content stream 12 being communicated with the wireless communication device 14. The handover may be performed when a detected scene transition occurs in the content stream 12, or when a detected number of consecutive black frames in the content stream 12 is greater than or equal to a threshold, or when a period of silence occurs in the content stream 12, or when a quiescent period occurs in gaming packets within the content stream 12, for example. A handover component 66 may perform the handover when any of these detected features occurs in order to mitigate impairments perceived by a viewer/listener 64 who is using the wireless communication device 14 to view/listen to the content stream 12.

By delaying the actual handover from a first time of the request in block 40 to a second time corresponding to the specific feature detected in block 56, handovers are avoided during complex and information-rich portions of the content stream 12 (e.g., a winning touchdown pass in a football game). Constraints on the length of the delay are relaxed where multiple reliable network connectivity options simultaneously exist for the wireless communication device 14. Optionally, the actual handover may be delayed based on time-of-day, day-of-week, or other events.

The handover changes how the act in block 10 wirelessly communicates subsequent portions of the content stream with the wireless communication device 14. The handover may be from the licensed wireless band 16 to the unlicensed wireless band 20, or from the unlicensed wireless band 20 to the licensed wireless band 16, as depicted in the case illustrated in FIG. 2. As an alternative to the case illustrated in FIG. 2, the handover may be performed between two base stations in the licensed wireless band 16, or between two base stations in the unlicensed wireless band 20. Thus, in general, the handover is performed between a first wireless band and a second wireless band.

The acts indicated by blocks 40, 44, 56 and 60 can be repeated one or more times during the streaming of the content stream 12 to cause one or more additional handovers. The handovers may be performed for any mix of licensed and unlicensed wireless bands.

It is noted that the aforementioned embodiments can be modified to produce alternative embodiments. For example, anyone or more of the acts indicated by blocks 44, 56 and 70 may be performed at the client side (e.g., by the wireless communication device 14) rather than at the network side so that the handover decision is initiated by the client. Further, the handover decision may be performed for a content stream that is communicated from the client to the network (e.g., if the wireless communication device 14 is sending video content) rather than from the network to the client.

Figure 3:
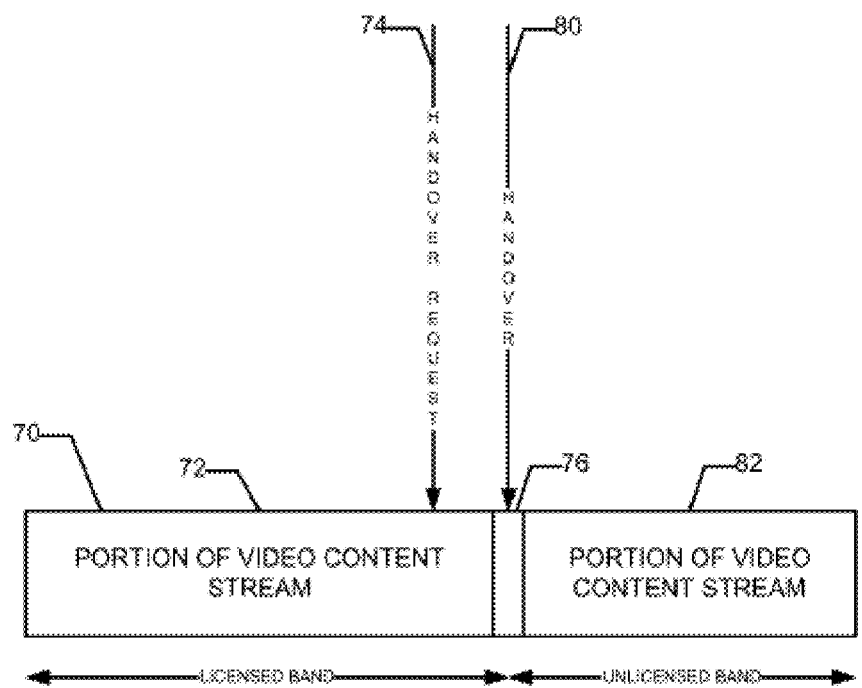
FIG. 3 illustrates an example timing of a handover for a video content stream.

FIG. 3 illustrates an example timing of a handover for a video content stream 70. A first portion 72 of the video content stream 70 is streamed to the wireless communication device 14 using the licensed wireless band 16 (e.g., a cellular band) but not the unlicensed wireless band 20 (e.g., a Wi-Fi band). The wireless communication device 14 receives the first portion 72 and displays video encoded by the first portion 72.

During streaming of the first portion 72, a handover request 74 is generated. A scene transition and/or a number of consecutive black frames is detected in a second portion 76 of the video content stream 70. A handover 80 of the wireless communication device 14 from the licensed wireless band 16 (e.g., the cellular band) to the unlicensed wireless band 20 (e.g., the Wi-Fi band) is delayed until the scene transition and/or consecutive black frames occurs in the video content stream 70.

The second portion 76 of the video content stream 70 is streamed in a manner depending on whether a hard handover or a soft handover occurs. For example, the second portion 76 may be streamed using both the licensed wireless band 16 and the unlicensed wireless band 20 for a soft handover. The wireless communication device 14 receives the second portion 76 and displays video encoded by the second portion 76.

Thereafter, a third portion 82 of the video content stream 70 is streamed to the wireless communication device using the unlicensed wireless band 20 (e.g., the Wi-Fi band) but not the licensed wireless band 16 (e.g., the cellular band). The wireless communication device 14 receives the third portion 82 and displays video encoded by the third portion 82.

Embodiments may results in an improved experience for users who view/listen to real-time and/or time-sensitive content streams. Embodiments may result in a more simplified handover due to a relaxation in handover performance metrics.

While described herein for handovers between licensed and unlicensed wireless bands, embodiments are also applicable for handovers between pay networks and free networks, subscriber-based networks and networks that are not subscriber based, closed networks and open networks, wireless networks and wire line networks, and pairs of wire line networks. In general, content-sensitive handover methods and systems can be used to switch between different network access base stations or channels, or between different types of networks when listening to or viewing real-time streaming media to mitigate any perceived impairments that result from the switch.

Figure 4:
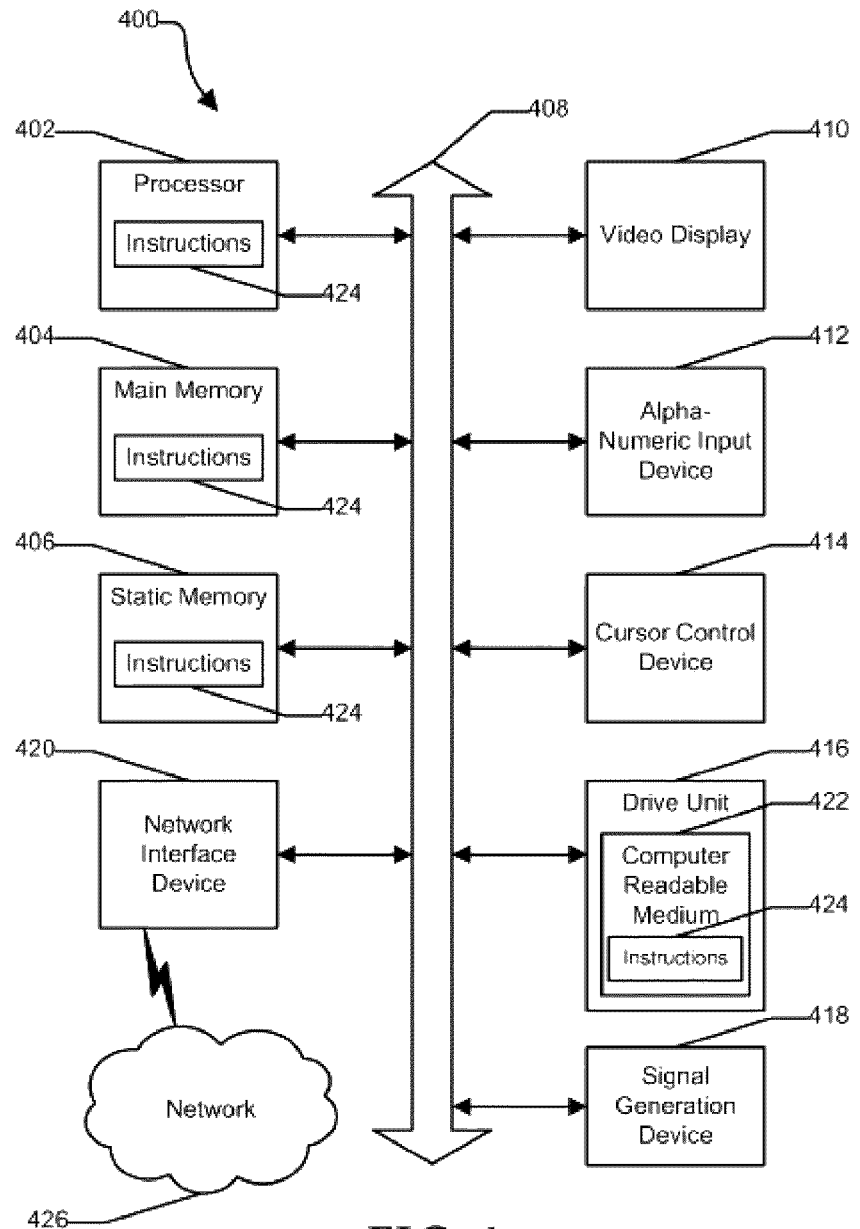
FIG. 4 is a block diagram of an illustrative embodiment of a general computer system.

Referring to FIG. 4, an illustrative embodiment of a general computer system is shown and is designated 400. The computer system 400 can include a set of instructions that can be executed to cause the computer system 400 to perform anyone or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g., software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform anyone or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include anyone or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP)

represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    identifying, by a system including a processor, a request for a handover of a wireless communication device between a first wireless band and a second wireless band;
    processing, by the system, video content of a content stream being communicated using the wireless communication device to detect a scene transition from video frames of the video content, wherein the scene transition is detected while a portion of the content stream is being received by the wireless communication device, wherein the scene transition is detected without identifying consecutive black frames in the video content and without identifying a pre-determined period of silence in audio content of the content stream; and
    delaying the handover until the scene transition within the video content is detected, the delaying accordingly having a delay time interval, wherein a length of the delay time interval has a constraint in accordance with connectivity options for the wireless communication device,
    wherein the handover is performed without input from a user, and
    wherein during the handover the content stream is communicated using both the first wireless band and the second wireless band.

2. The method of claim 1, wherein the first wireless band is a licensed wireless band, wherein the second wireless band is an unlicensed wireless band, wherein the delaying is performed by the system, and wherein the system operates in the wireless communication device.

3. The method of claim 2, wherein the licensed wireless band comprises a cellular telephone network band, wherein the delaying of the handover is based on a time of day.

4. The method of claim 2, wherein the unlicensed wireless band comprises a Wireless Fidelity band, and wherein the system operates in a set top box.

5. The method of claim 2, wherein the handover is from the licensed wireless band to the unlicensed wireless band.

6. The method of claim 2, wherein the handover is from the unlicensed wireless band to the licensed wireless band.

7. An apparatus comprising:
    a memory to store instructions; and
    a processor coupled to the memory, wherein the processor, responsive to executing the instructions, performs operations comprising:
        processing video content of a content stream being communicated to a wireless communication device to detect a scene transition, wherein the scene transition is detected while a portion of the content stream is being received by the wireless communication device, wherein the scene transition is detected without identifying consecutive black frames in the video content and without identifying a pre-determined period of silence in audio content of the content stream; and
        initiating a handover of the wireless communication device between a first wireless band and a second wireless band in response to the detecting of and during the scene transition within the video content, wherein the handover is initiated subsequent to a delay time interval, a length of the delay time interval having a constraint in accordance with connectivity options for the wireless communication device,
        wherein the handover is initiated without input from a user, and
        wherein during the handover the content stream is communicated using both the first wireless band and the second wireless band.

8. The apparatus of claim 7, wherein the first wireless band is a licensed wireless band, wherein the second wireless band is an unlicensed wireless band, and wherein the processor performs the handover using a third wireless band that is an unlicensed band.

9. The apparatus of claim 8, wherein the first wireless band is a licensed wireless band and wherein the second wireless band is an unlicensed wireless band.

10. The apparatus of claim 9, wherein the licensed wireless band comprises a cellular telephone network band.

11. The apparatus of claim 9, wherein the unlicensed wireless band comprises a Wireless Fidelity band.

12. A non-transitory computer-readable storage device comprising instructions which, responsive to being executed by a processor, cause the processor to perform operations comprising:

processing video content of a content stream being communicated to a wireless communication device to detect a scene transition, wherein the scene transition is detected while a portion of the content stream is being received by the wireless communication device, wherein the scene transition is detected without identifying consecutive black frames in the video content and without identifying a pre-determined period of silence in audio content of the content stream; and performing a handover of the wireless communication device between a first wireless band and a second wireless band responsive to the detecting of and during the scene transition, wherein the handover is performed subsequent to a delay time interval, a length of the delay time interval having a constraint in accordance with connectivity options for the wireless communication device, wherein the handover is performed without input from a user, and wherein during the handover the content stream is communicated using both the first wireless band and the second wireless band.

13. A non-transitory computer-readable storage device of claim 12, wherein the first wireless band is a licensed wireless band, wherein the second wireless band is an unlicensed wireless band, and wherein the operations further comprise performing the handover using a third wireless band that is a second unlicensed band.

14. A non-transitory computer-readable storage device of claim 12, wherein the first wireless band is a licensed wireless band and wherein the second wireless band is an unlicensed wireless band.

15. A non-transitory computer-readable storage device of claim 14, wherein the licensed wireless band comprises a cellular telephone network band.

16. A non-transitory computer-readable storage device of claim 14, wherein the unlicensed wireless band comprises a Wireless Fidelity band.

* * * * *